(12) United States Patent
Parkkinen et al.

(10) Patent No.: US 8,010,158 B2
(45) Date of Patent: Aug. 30, 2011

(54) SYNCHRONIZATION OF MOBILE TERMINALS

(75) Inventors: Jukka Antero Parkkinen, Oulu (FI); Kari Pentti Ilari Kaarela, Oulu (FI); Marko Johannes Leukkunen, Oulu (FI); Kirmo Kalevi Koistinen, Oulu (FI); Mikko Antti Juhani Hyvarinen, Oulu (FI); Antti Pekka Juhani Keinanen, North Vancouver (CA); Terje Kennet Bergstrom, Espoo (FI); Laura Johanna Majava, Lahti (FI); Kimmo Matti Mikkonen, Kerava (FI); Johanna Maria Tiitola, Helsinki (FI)

(73) Assignee: Nokia Corporation, Espoo (FI)

( * ) Notice: Subject to any disclaimer, the term of this patent is extended or adjusted under 35 U.S.C. 154(b) by 879 days.

(21) Appl. No.: 11/963,169

(22) Filed: Dec. 21, 2007

(65) Prior Publication Data

US 2009/0163244 A1    Jun. 25, 2009

(51) Int. Cl.
*H04B 1/38* (2006.01)

(52) U.S. Cl. ........... 455/558; 455/417; 455/435.1; 455/445; 455/466

(58) Field of Classification Search ............... 455/417, 455/435.1, 445, 466
See application file for complete search history.

(56) References Cited

U.S. PATENT DOCUMENTS

| 7,181,217 B2 * | 2/2007 | Kalavade ........... 455/435.1 |
| 2004/0180657 A1 * | 9/2004 | Yaqub et al. ......... 455/435.1 |
| 2008/0207236 A1 * | 8/2008 | Boerries et al. ....... 455/466 |

* cited by examiner

*Primary Examiner* — Nghi H Ly
*Assistant Examiner* — Amancio Gonzalez
(74) *Attorney, Agent, or Firm* — Banner & Witcoff Ltd.

(57) ABSTRACT

Embodiments are directed to activation and performance of multiple-subscriber-identity-module ("multi-SIM") automatic synchronization of mobile devices. A user may specify one or more data types for which multi-SIM automatic synchronization should be performed, which may include incoming calls, sent text messages, and the like. Information about an answered incoming call may be sent from a first mobile device to at least one additional mobile device so that the at least one mobile device may update at least one call log and may remove at least one notification for the call accordingly. When multi-SIM automatic synchronization is performed for sent text messages, the first mobile device may send a copy of the sent text message to the at least one additional mobile device so that the received copy may be stored in the sent messages folder of the at least one additional mobile device.

24 Claims, 10 Drawing Sheets

SYNCHRONIZATION OF MOBILE TERMINALS

FIELD

Embodiments relate generally to synchronization of mobile terminals. More specifically, embodiments relate to synchronization of mobile terminals that share a common telephone number.

BACKGROUND

In a multi-SIM (subscriber identity module) scenario, a mobile-device user may have multiple devices that share a single phone number and/or subscriber identity. A SIM may be part of a removable smart card ICC (Integrated Circuit Card), also referred to as a SIM card, for mobile telephony devices, such as mobile computers and mobile phones. SIM cards may be used for securely storing the service-subscriber key used to identify a subscriber. A SIM card allows users to change mobile devices (e.g., phones) by simply removing the SIM card from one mobile device and inserting it into a different mobile device.

In a multi-SIM service, there may be two (or more) SIM cards with the same phone number such that it is possible to have incoming phone calls and other services, like messages, directed to two devices at the same time. For example, a user, using two phones, but having only one phone number, may be reached via either of the two phones.

Such a scenario may cause problems, though, due to the two mobile devices not communicating with each other. Automatic communication between such mobile devices is typically not possible, as the SIM cards' phone numbers are not mediated to the phones in which the SIM cards are placed. This means that the phone in which the SIM card is placed is not aware of the number of the SIM card. Thus, it is not possible for the device to automatically check whether two SIM cards have the same number. Instead, the input for this information may come from some other source, e.g., the user of the phone.

For example, in the case of an incoming call to a mobile phone, the call is typically alerted in both phones. Once the call is answered in one of the phones, it remains as a missed call in the other phone. This makes it difficult to track which of the calls were really missed, and which ones were answered.

For example, suppose that a first mobile phone is in active use, and the other mobile phone is in silent mode in a user's hand bag. When taking the phone out of the hand bag after three days, the user notices that there are 23 missed calls. In reality, only 2 calls were actually missed (i.e., 21 calls were answered via the first phone). Finding out which calls were really missed requires a lot of manual work by the user. Further, because the phone clocks may be set to different times and one or both of the time settings of the phones may have changed since some or all of the calls have been received and/or missed, it may even be impossible to determine manually which calls were actually missed.

As such, improved techniques for automatically synchronizing data between mobile devices would advance the art.

BRIEF SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the more detailed description below.

Embodiments are directed to activation and performance of multiple-subscriber-identity-module ("multi-SIM") automatic synchronization of mobile devices. A user may specify one or more data types for which multi-SIM automatic synchronization should be performed, which may include incoming calls, sent text messages, and the like. Information about an answered incoming call may be sent from a first mobile device to at least one additional mobile device so that the at least one mobile device may update at least one call log and may remove at least one notification for the call accordingly. When multi-SIM automatic synchronization is performed for sent text messages, the first mobile device may send a copy of the sent text message to the at least one additional mobile device so that the received copy may be stored in the sent messages folder of the at least one additional mobile device.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Certain embodiments are directed to synchronizing call-logs, sent messages, and the like in a multi-SIM (subscriber identity module) scenario where a user has multiple devices that can be accessed by a single phone number. For example, when a call is answered, a missed call notification is not shown in the other phone. Instead, logs are updated in both phones, to indicate that the call was answered.

Figure 1:
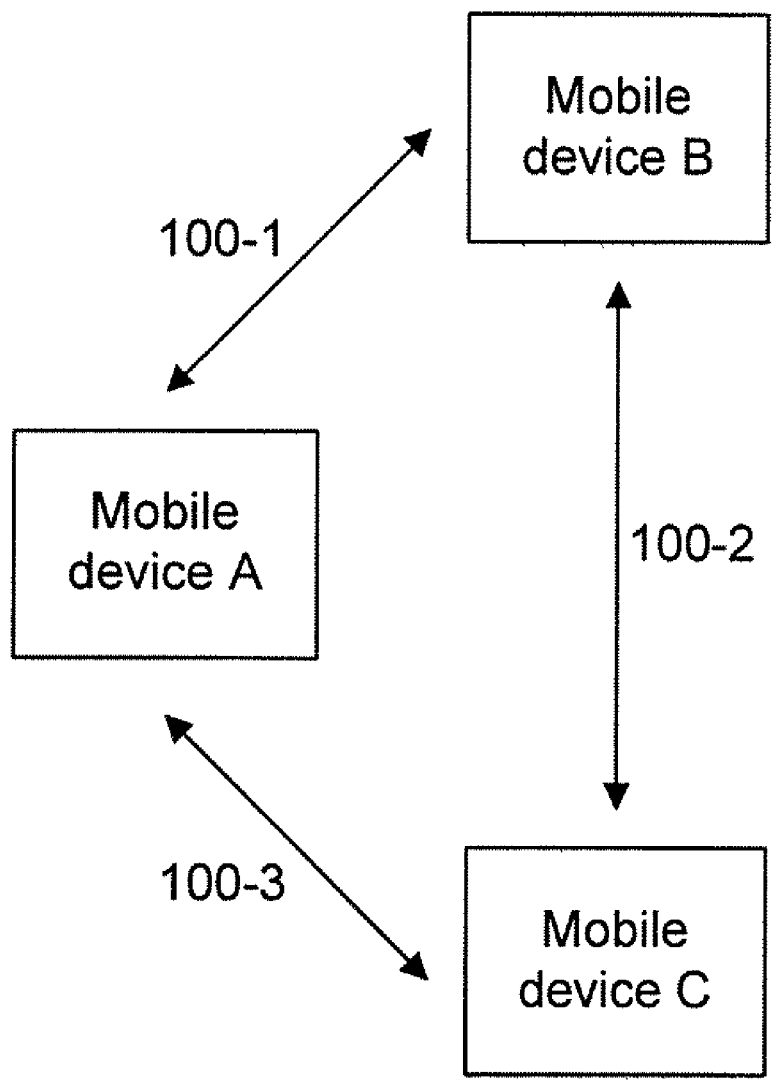
FIG. 1 is a schematic diagram of mobile devices in which certain embodiments of the invention may be implemented.

FIG. 1 is a schematic diagram of mobile devices in which certain embodiments of the invention may be implemented. Mobile devices A, B, and C may communicate with one another (and any additional mobile devices depicted by the ellipses below mobile device C in FIG. 1) via communication links 100-1, 100-2, and 100-3, which may be any appropriate type of communication, including, but not limited to: unconfirmed WAP (Wireless Application Protocol) push, unconfirmed WAP pull, Bluetooth, IRDA (Infrared Data Association), WLAN (Wireless Local Area Network) and the like. WAP push may be sent from a terminal to another without any servers by, for example, SMS (Short Message Service).

Figure 2:
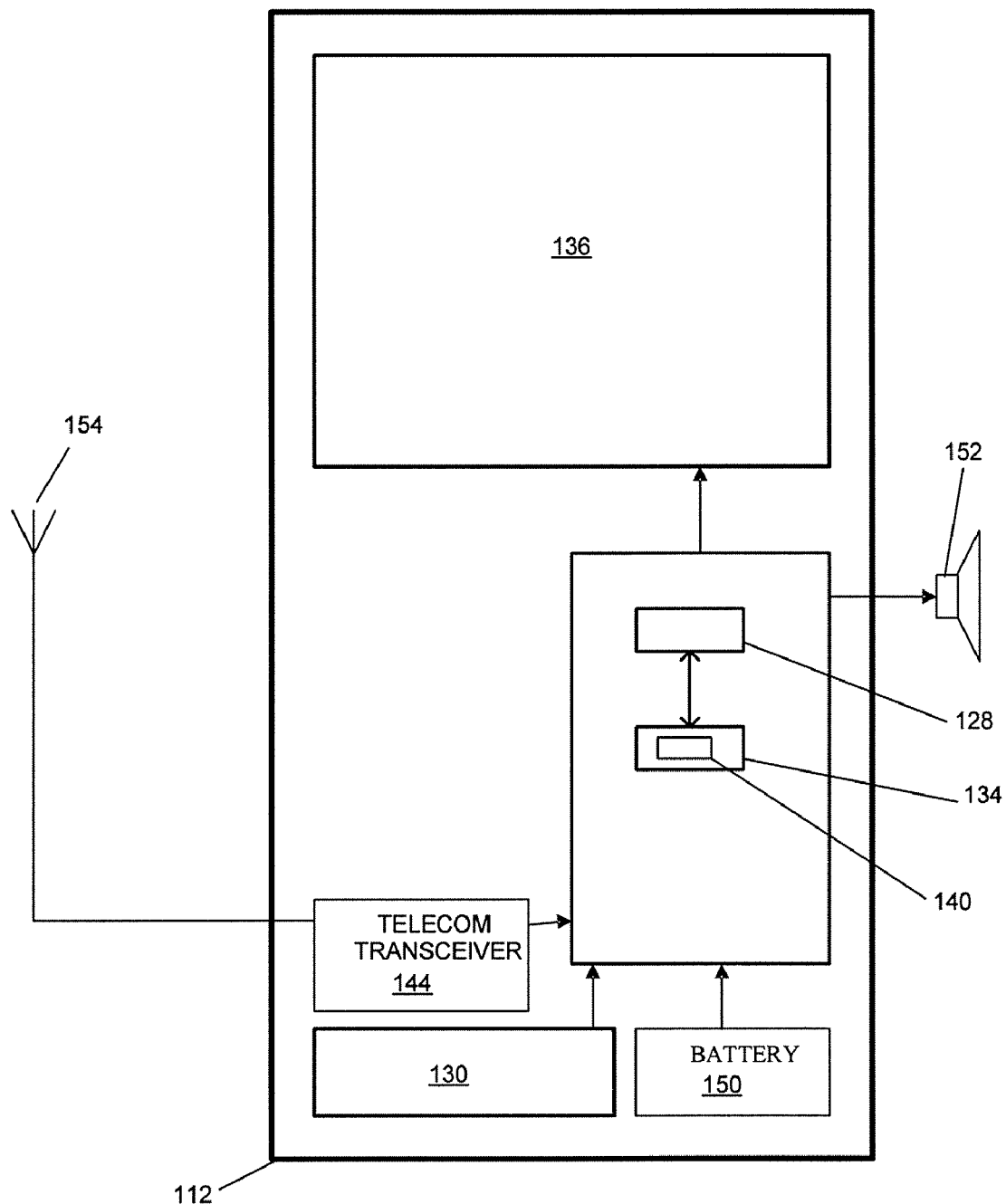
FIG. 2 illustrates an example of a mobile device in which one or more illustrative embodiments of the invention may be implemented.

FIG. 2 illustrates an example of a mobile device in which one or more illustrative embodiments of the invention may be implemented. As shown in FIG. 1, mobile device 112 may include processor 128 connected to user interface 130, memory 134 and/or other storage, and display 136, which may be used for displaying information to a mobile-device user. Mobile device 112 may also include battery 150, speaker 152 and one or more antennas 154. User interface 130 may further include a keypad, touch screen, voice interface, one or more arrow keys, joy-stick, data glove, mouse, roller ball, touch screen, or the like.

Computer executable instructions and data used by processor 128 and other components within mobile device 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile device 112 to perform various functions. Alternatively, some or all of mobile device 112 computer executable instructions may be embodied in hardware or firmware (not shown).

Mobile device 112 may be configured to wirelessly exchange messages with other devices via, for example, telecom transceiver 144. The mobile device may also be provided with other types of transceivers, transmitters, and/or receivers, such as Bluetooth, infrared, and the like.

Figure 3:
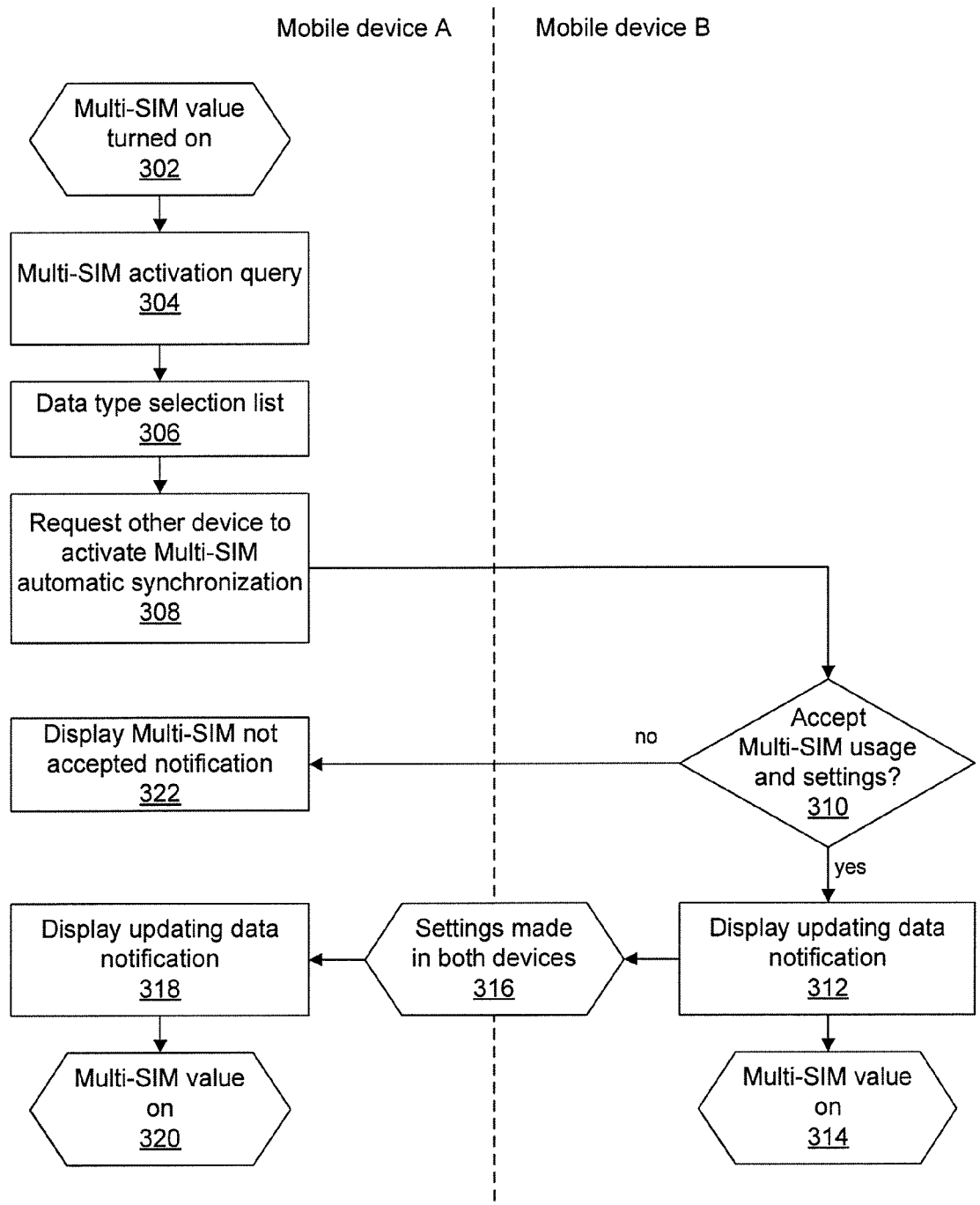
FIG. 3 is a flow diagram showing steps for activating multi-SIM automatic synchronization in accordance with certain embodiments.
Figure 4:
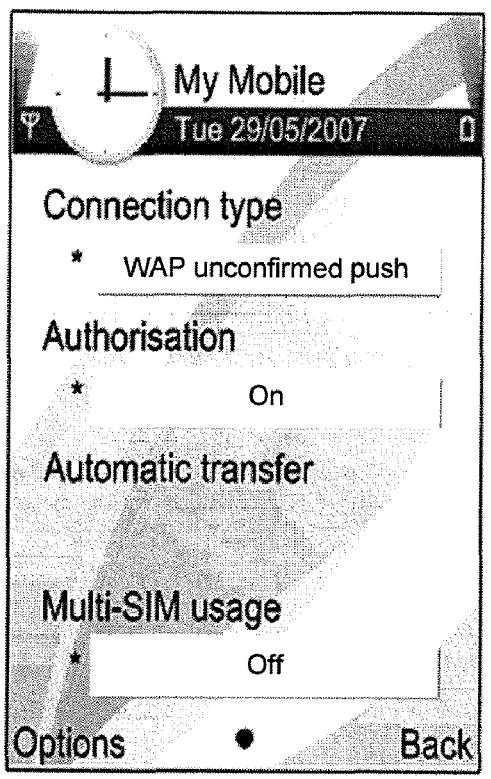
FIGS. 4-9 are example display screens in accordance with certain embodiments.

FIG. 3 is a flow diagram showing steps for activating multi-SIM automatic synchronization in accordance with certain embodiments. FIG. 4 is an example display screen in accordance with certain embodiments. Automatic synchronization may be deactivated as a default setting, as shown in FIG. 4, in accordance with certain embodiments. Activation of multi-SIM automatic synchronization may be initiated by turning on a Multi-SIM automatic synchronization value, as indicated at 302.

When a user activates multi-SIM automatic synchronization, a Multi-SIM activation query may be displayed, as shown at 304, with text such as: "By activating this service you can keep two phones with the same phone number up-to date. The other phone should support the functionality. WAP unconfirmed push authorization should be set on in both phones. Information will be copied to the other phone as well," as shown in FIG. 5.

In accordance with certain embodiments, when automatic synchronization is activated, one or more items that are displayed in a phone's standby state notifications may be synchronized, including, but not limited to: missed calls, missed POC (Push-to-talk Over Cellular) calls, POC callback requests, new messages, invitations, instant messages, E-mail messages, voice messages, and audio messages.

If the phone is in flight mode or offline mode, an information note with text "Service can not be activated in offline mode" may be displayed.

Figure 5:
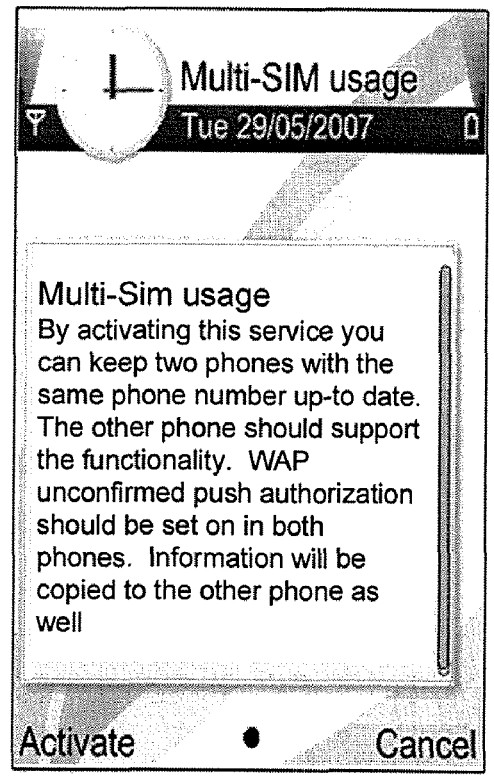

If a user activates multi-SIM automatic synchronization in response to the multi-SIM activation query shown in FIG. 5, a multi-selection list for synchronization data types may be displayed, as shown at 306.

Figure 6:
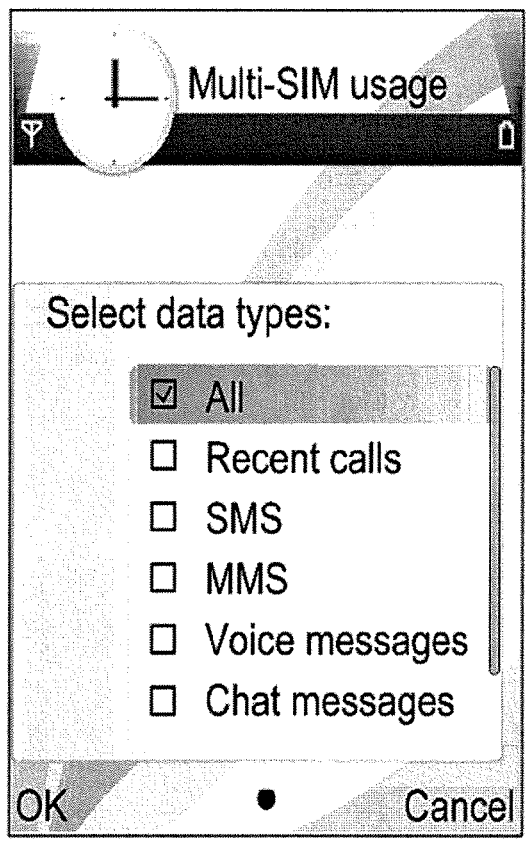

FIG. 6 shows a partial list of synchronization data types in accordance with certain embodiments. Data types may include, but are not limited to: all available data types, recent calls, SMS, MMS (Multimedia Messaging Service), voice messages, chat messages, missed calls, missed POC calls, POC callback requests, new messages, invitations, instant messages, and E-mail messages.

Activating multi-SIM automatic synchronization on a first mobile device may affect one or more other mobile devices. For example, a user may have a first mobile phone, referred to herein as phone A, for use during the work week and a second mobile phone, referred to herein as phone B, for use on weekends. Examples involving two phones are discussed herein, but in certain embodiments, three or more mobile devices may perform multi-SIM automatic synchronization with one another.

A request may be sent from mobile device A to mobile device B to activate multi-SIM automatic synchronization, as shown at 308, which may cause settings of mobile device A to be created in mobile device B. While the settings are being created in mobile device B, mobile device A may display a screen such as the one shown in FIG. 7.

Clocks in both mobile devices A and B may be checked. Each mobile device may send to the other mobile device information about each mobile device's time setting, and any differences in the time settings between the devices for particular operations may be calculated based on any time differences between the mobile devices. Thus, if a device clock time difference has been noticed, e.g., 1 min 25 seconds between the two devices, this is taken into consideration when events are compared. If an incoming call from a same number is noticed to have taken place at 11.00.00 in one device, and at 11.01.25 in the other one, and it has been answered on one device, but missed on the other device, the two instances of the call may be considered to be for the same call. Thus, in the device on which the call was missed, the call is marked as an answered call. A small time difference may be accepted because there may be external factors, such as connection creation, that may cause a small delay. Time difference calculation may be performed without alerting the user to any calculated time difference.

When a mobile device's clock time has been changed (by the user or by the system), the time change may be taken into account, and the one or more other mobile devices with which the mobile device has activated multi-SIM automatic synchronization (e.g., phone B) may be notified.

Figure 8:
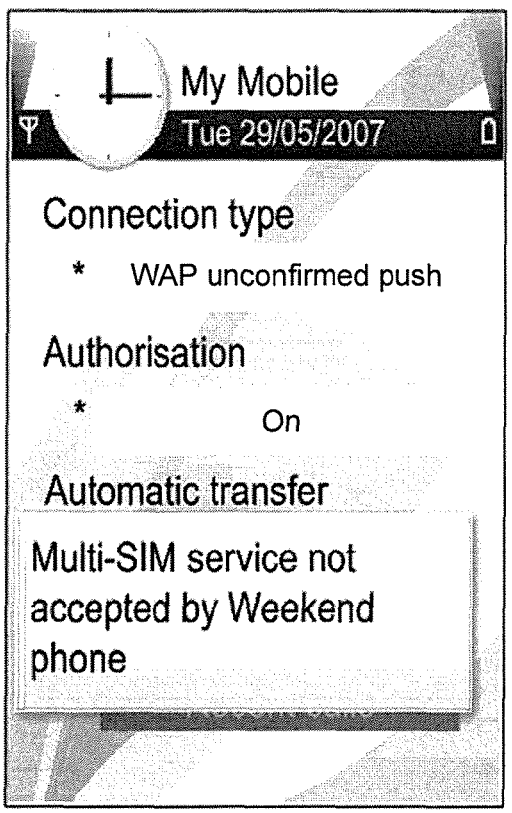

In mobile device B, the user may be asked for confirmation. For example, a message such as "An attempt to activate Multi-SIM usage has been made by another mobile device. To have two mobile devices with the same number up-to-date, WAP unconfirmed push authorization should be set on. Activate the multi-SIM automatic synchronization service?" If the user does not respond affirmatively to activate the multi-SIM automatic synchronization service, then the service may not be activated, as shown by following the "no" branch from 310 to 322, mobile device A may be notified accordingly, as shown in FIG. 8, and a multi-SIM automatic synchronization authorization value may return to inactive.

If mobile device A does not receive a confirmation of multi-SIM automatic synchronization being activated after a time-out, an error message, such as "The other mobile device was not found. Check that WAP unconfirmed push is on" may be displayed. If there continues to be no response from mobile device B, a query may be displayed: "No response from the other mobile device. Try again?" If the user declines the query, a multi-SIM usage settings value may be returned to "Multi-SIM usage off."

Figure 7:
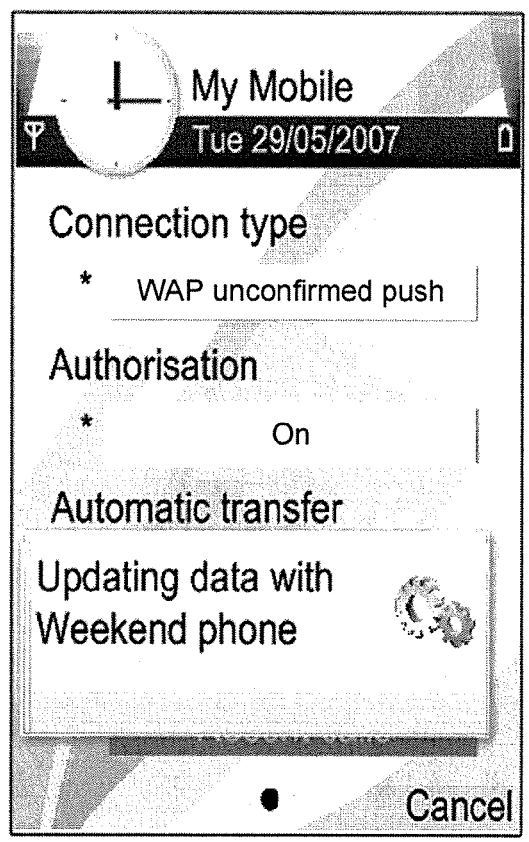

If mobile device B accepts the multi-SIM usage request and settings from mobile device A, then the "yes" branch from 310 is followed to 312, an updating data message, similar to the one shown in FIG. 7, may be displayed by mobile device B, and mobile device B's multi-SIM value may be turned on, as shown at 314.

Once both mobile devices have accepted activation of multi-SIM automatic synchronization, Multi-SIM automatic synchronization settings (e.g., data types, WAP unconfirmed push authorization, time difference calculation, and the like) may be made in both mobile devices, as shown at 316. An updating data notification, such as the one shown in FIG. 7, may be displayed, as shown at 318, and mobile device A's multi-SIM value may be turned on, as shown at 320.

Figure 9:
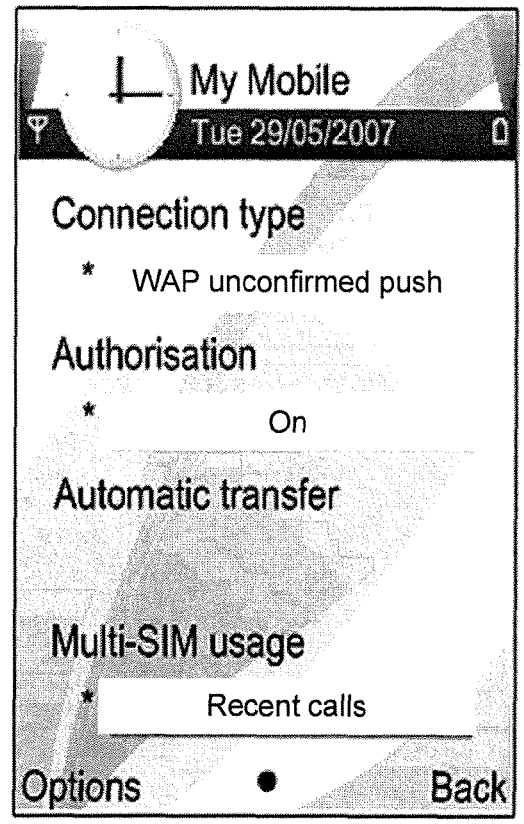

FIG. 9 shows an example display screen in accordance with certain embodiments. Once multi-SIM automatic synchronization has been activated, a screen such as the one shown in FIG. 9 may displayed to indicate a multi-SIM usage, such as "recent calls." Other data types being automatically synchronized may also be displayed as appropriate. In certain embodiments, when data types have been selected, a settings value field displays the selected data types: "All data types", if all available data types have been selected; "data type name," if only one data type has been selected; and "multiple selected", if some, but not all, of the data types have been selected.

Once multi-SIM automatic synchronization is activated on one or more mobile devices, performance of multi-SIM automatic synchronization may begin.

Periodic monitoring may be performed in each mobile device, which is involved in multi-SIM automatic synchronization, for the occurrence of events for which multi-SIM automatic synchronization is being performed. For example, when mobile device A or mobile device B notices an action that affects multi-SIM automatic synchronization, appropriate information may be sent to the other mobile device.

Figure 10:
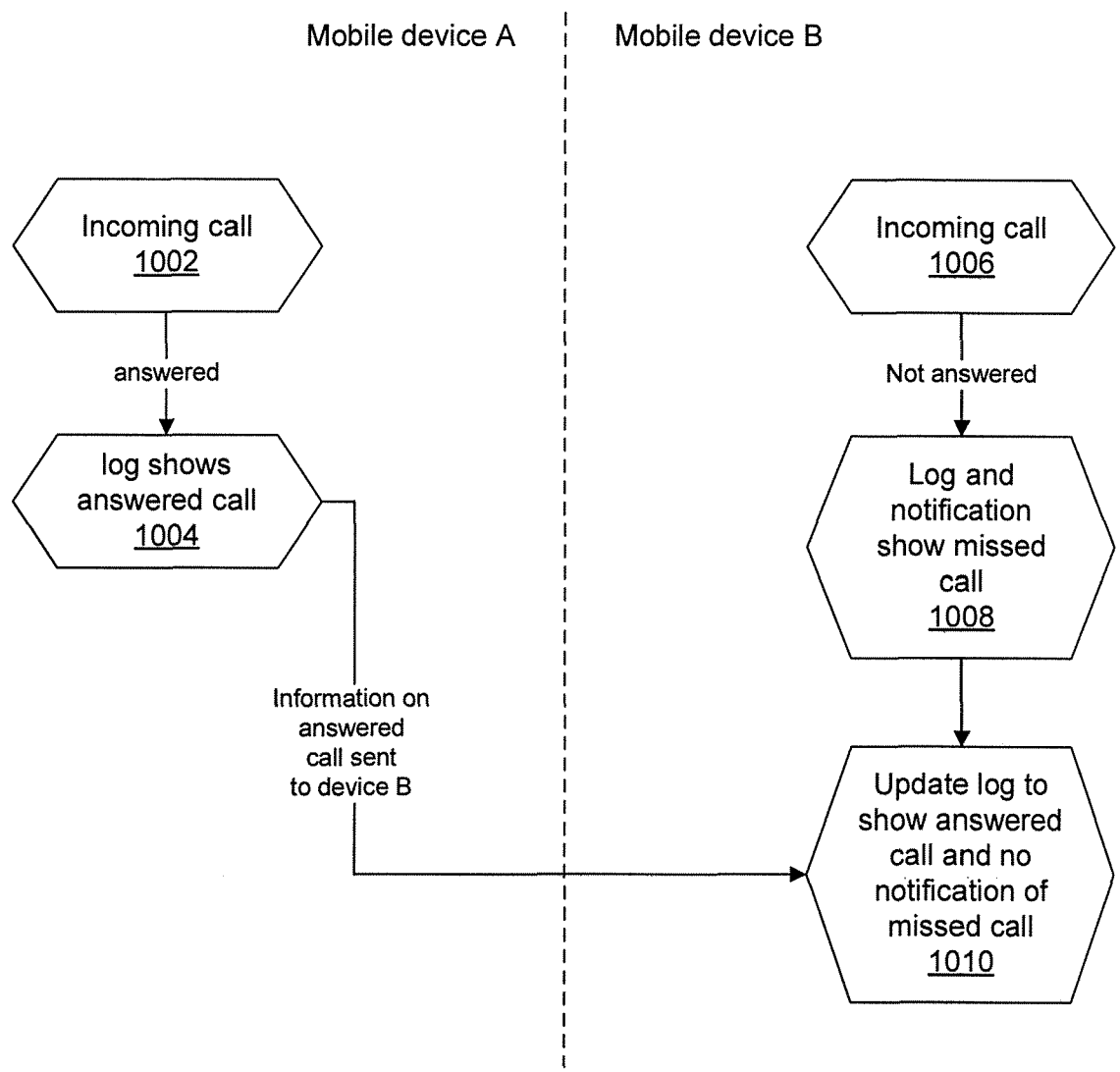
FIG. 10 shows example steps for performing multi-SIM automatic synchronization for an incoming call in accordance with certain embodiments.

For example, FIG. 10 shows example steps for performing multi-SIM automatic synchronization for an incoming call in accordance with certain embodiments. An incoming call is answered by mobile device A, and mobile device A's log is updated to show that the call was answered, as shown at 1002 and 1004. Information about the answered call is sent to device B, as shown by the arrow between 1004 and 1010.

The same incoming call that was answered by mobile device A was not answered by mobile device B, and mobile device B's log and notification show the call as a missed call, as shown at 1006 and 1008. In response to receiving the information about the answered call from device A, device B's log is updated accordingly and the notification of the missed call is removed, as shown at 1010. Existing logs application and messaging systems already have API's (Application Programming Interfaces) that can be used to reset the messages like "3 missed calls" and the like.

Time stamps, along with the other information that data being synchronized contains, may be used to find matching synchronization items. Mobile devices typically do not have a stable system time. Time settings may be changed by the user or by the network. In certain embodiments, this situation may be addressed by sending the device's system time during each synchronization session. In this way, the changes of the device's system time will be taken into account when comparing the items' time stamps. Items may be noted as corresponding to the same item if the other data matches, and time stamps would belong to the same time window, calculated based on the system time information. Because the precise time between synchronization sessions when the time setting was changed is unknown, two time windows may be used. One time window may be used in which the time has not changed, and, in the other time window, the time is considered to have changed for the duration of the time window. This solution does not cover all the cases, but would typically be an accurate enough approximation.

If the other mobile device is not in range for communication, synchronisation may be tried according to defined settings, and may be performed when it is possible. For example, communication may be attempted every 5 minutes for the first 30 minutes, every 30 minutes for the next 12 hours, and every 120 minutes after that.

If data type modifications are done in one of the mobile devices, information may be sent to the other one or more mobile devices in a manner similar to that discussed above in connection with Multi-SIM automatic synchronization activation. Similarly, if Multi-SIM automatic synchronization usage is turned off in one of the mobile devices, information may be sent to the other one or more mobile devices in a manner similar to that discussed above in connection with Multi-SIM automatic synchronization activation.

In certain embodiments, multi-SIM synchronization may happen periodically or based on requests. The request may be made manually or automatically after one or more communication events. One implementation may include operator/network driven functionality in which the operator performs the call log update/synchronization by sending signalling messages based on the network.

In another implementation, a transaction log may be created locally. The transaction log may then be periodically sent to the network and/or one or more other mobile devices. The network may send the log to Multi-SIM devices, and the synchronization may be done locally based on this log. The sending method may be a WAP unconfirmed push message, which is not visible to the user. The transaction log may contain information that specifies where to save the arrived messages and which calls have been answered and which have not been answered, and the like.

Figure 12:
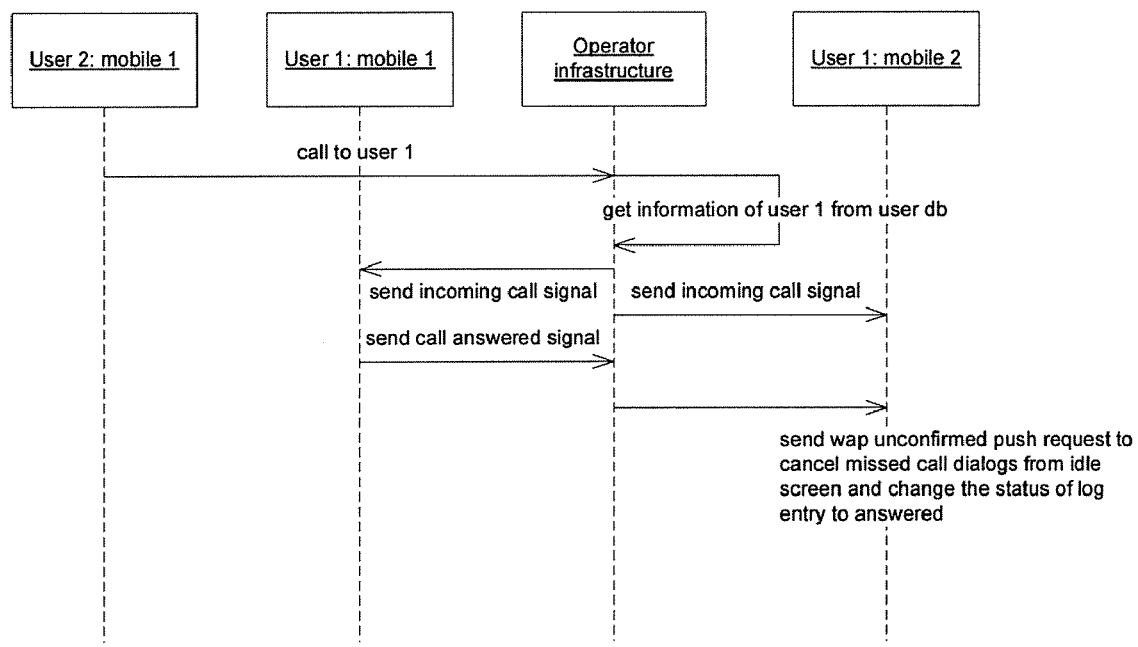
FIG. 12 is a schematic diagram that shows signal flow for multi-SIM call status synchronization in accordance with certain embodiments.

In yet another implementation, a network operator may connect a data call or other connection between the multi-SIM devices, and the transaction logs may then be synchronized via that connection. The network operator may have a list of the multi-SIM numbers and may send the synchronization logs concerning phone calls and information about answered calls to multi-SIM devices. FIG. 12 is a schematic diagram that shows signal flow for multi-SIM call status synchronization in accordance with certain embodiments. As shown in FIG. 12, in response to user 2 making a call to user 1, the network operator may obtain information about user 1 from a user database and may send an incoming call signal to user 1's mobile devices (i.e., mobile device 1 and mobile device 2). Upon receiving a call answered signal from one of user 1's mobile devices (e.g., mobile device 1), the network operator may send a WAP unconfirmed push request to cancel call dialogs from an idle screen and to change the status of the log entry for the call on any other mobile devices (e.g., mobile device 2) from a missed call to an answered call.

Figure 13:
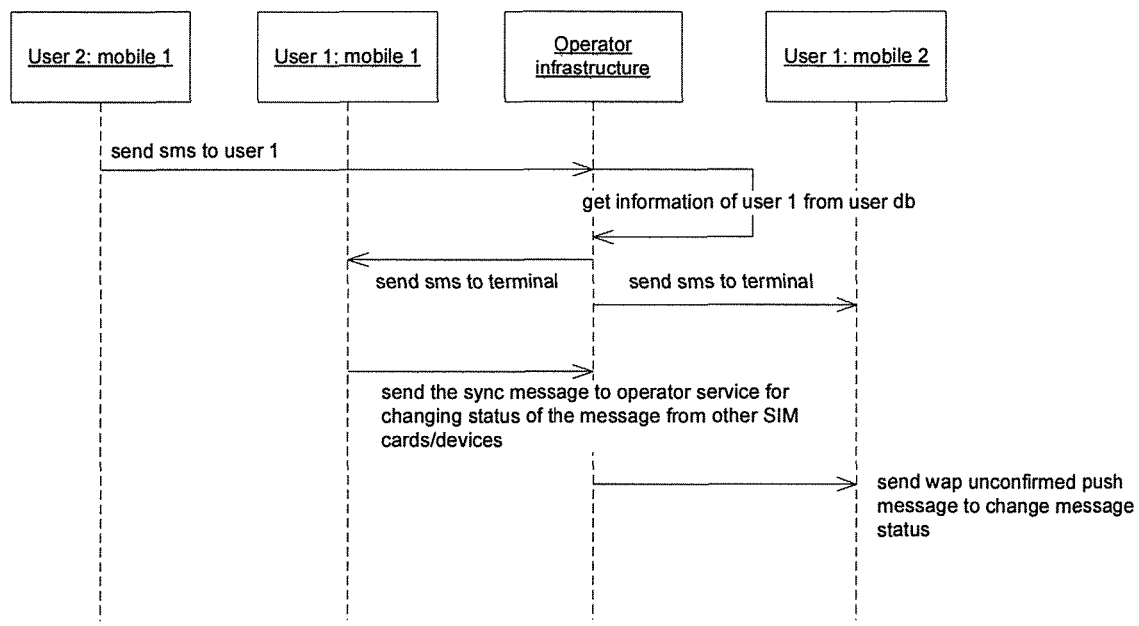
FIG. 13 is a schematic diagram that shows signal flow for multi-SIM message synchronization in accordance with certain embodiments.

For synchronization of text messages, the used terminal may send a synchronization log to the network operator, which then may send the synchronization information to the other terminals/SIM's. FIG. 13 is a schematic diagram that shows signal flow for multi-SIM message synchronization in accordance with certain embodiments. As shown in FIG. 13, in response to user 2 sending a text message to user 1, the network operator may obtain information about user 1 from a user database and may send SMS to user 1's mobile devices (i.e., mobile device 1 and mobile device 2). Upon receiving a message read signal from one of user 1's mobile devices (e.g., mobile device 1), the network operator may send a WAP unconfirmed push message to change the message status on any other mobile devices (e.g., mobile device 2) from an unread message to a read message.

In still another implementation, synchronization may be performed locally over Bluetooth or an analogous local connectivity radio, when the terminals are in relatively close proximity to one another.

Figure 11:
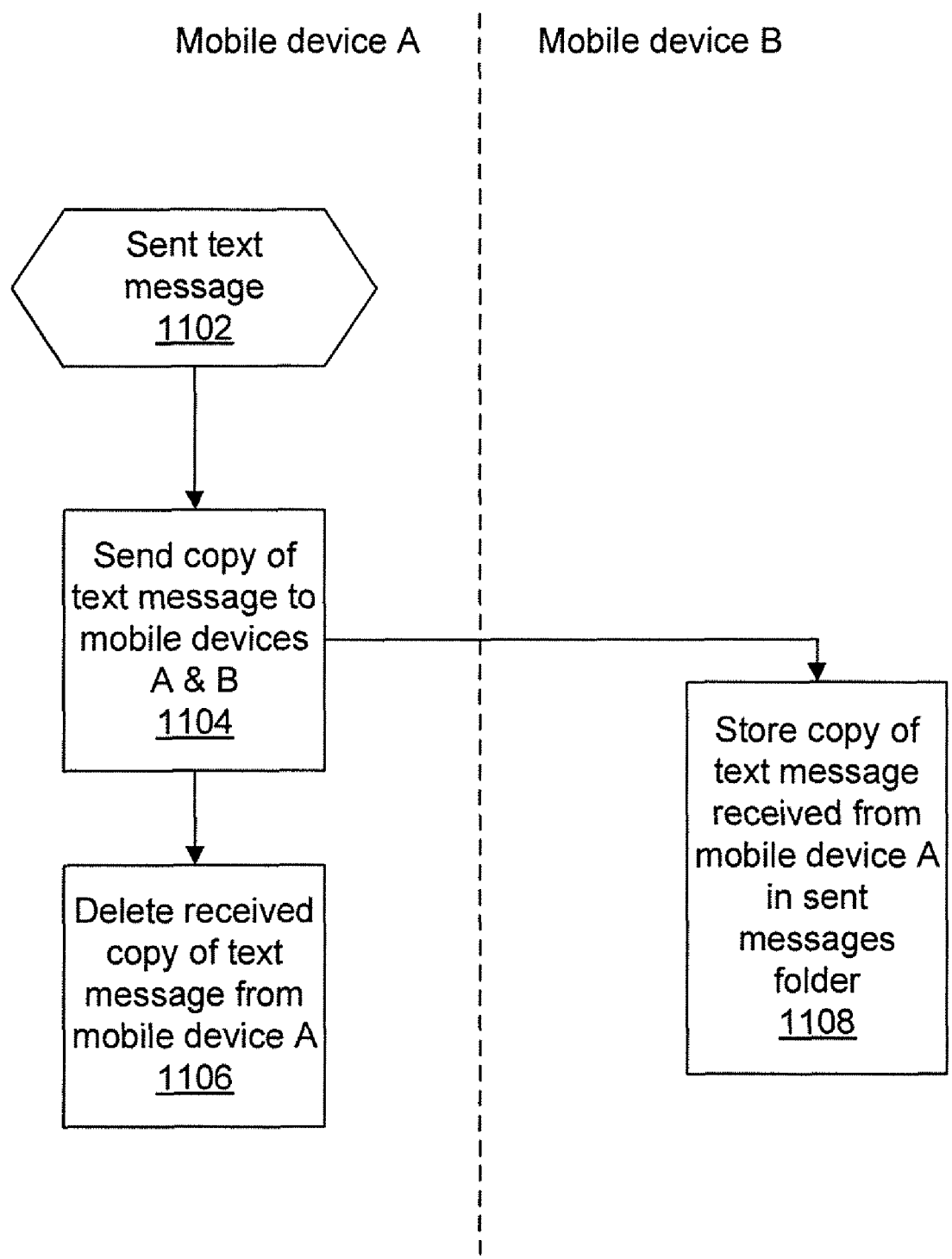
FIG. 11 is a flow diagram showing steps in accordance with certain embodiments for performing multi-SIM automatic synchronization of a sent text message.

FIG. 11 is a flow diagram showing steps in accordance with certain embodiments for performing multi-SIM automatic synchronization of a sent text message. In certain embodiments, a mobile device automatically sends a copy of a sent text message to its own telephone number (e.g., as a WAP unconfirmed push message), when the device is operating as a Multi-SIM device and multi-SIM automatic synchronization of sent text messages is enabled, as shown at 1102 and 1104. Each device having the same telephone number will receive the copy of the sent text message. The device that actually sent the message may delete the received copy of the sent text message, as shown at 1106, and any other devices may automatically store the received copy of the sent text message to its sent messages folder, as shown at 1108.

A device user may enable or disable such a sent text message synchronization service as desired via a settings menu.

In certain alternate embodiments, a network operator may host a service that sends the WAP unconfirmed push messages. In these embodiments, the copies of sent text messages are not sent from the mobile device. But, the message receiving logic and settings UI aspects discussed in connection with the embodiments of FIG. 11 may be present in the alternate embodiments.

One or more aspects of the invention may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), application specific integrated circuits (ASIC), and the like. The term "processor" and "memory" comprising executable instructions should be interpreted to include the variations described in this paragraph and equivalents thereof.

For example, in certain embodiments, functions, including, but not limited to, the following functions, may be performed by a processor executing computer-executable instructions that are recorded on a computer-readable medium: displaying a query for user input regarding activation of multiple-subscriber-identity-module ("multi-SIM") automatic synchronization; in response to user input indicating that multi-SIM automatic synchronization should be activated, displaying a query for user input regarding one or more data types for which multi-SIM automatic synchronization should be performed; sending from a first mobile device to at least one additional mobile device a request to activate multi-SIM automatic synchronization on the at least one additional mobile device for the one or more data types for which multi-SIM automatic synchronization should be performed; and upon receiving from the at least one additional mobile device notification of acceptance of the request to activate multi-SIM automatic synchronization on the at least one additional mobile device, activating multi-SIM automatic synchronization on the first mobile device, wherein the one or more data types for which multi-SIM automatic synchronization should be performed includes incoming calls and sending from the first mobile device to the at least one additional mobile device information about an answered incoming call.

Embodiments include any novel feature or combination of features disclosed herein either explicitly or any generalization thereof. While embodiments have been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:
1. A method comprising:
displaying a query for user input regarding activation of multiple-subscriber-identity-module ("multi-SIM") automatic synchronization;
in response to user input indicating that multi-SIM automatic synchronization should be activated, displaying a query for user input regarding one or more data types for which multi-SIM automatic synchronization should be performed, the one or more data types including incoming calls;
sending from a first mobile device to at least one additional mobile device a request to activate multi-SIM automatic synchronization on the at least one additional mobile device for the one or more data types for which multi-SIM automatic synchronization should be performed;
upon receiving notification of acceptance of the request to activate multi-SIM automatic synchronization on the at least one additional mobile device, activating multi-SIM automatic synchronization on the first mobile device; and
in response to the activating, sending from the first mobile device to the at least one additional mobile device information about an answered incoming call instructing the at least one additional mobile device to update one or more logs to indicate that the call was answered and to remove one or more notifications indicating that the call is a missed call.

2. The method of claim 1, wherein the one or more data types includes sent text messages and further comprising: sending from the first mobile device to the at least one additional mobile device a copy of a sent text message.

3. The method of claim 2, further comprising: deleting the copy of the sent text message received by the first mobile device.

4. The method of claim 1, wherein the first mobile device wirelessly sends the request to activate multi-SIM automatic synchronization to the at least one additional mobile device and wirelessly receives the notification of acceptance of the request to activate multi-SIM automatic synchronization from the at least one additional mobile device.

5. A method comprising:
receiving, by a first apparatus, a request from a second apparatus to activate multiple-subscriber-identity-module ("multi-SIM") automatic synchronization on the first apparatus for one or more data types for which multi-SIM automatic synchronization should be performed, the one or more data types including incoming calls;
displaying a query for user input regarding activation of multi-SIM automatic synchronization;
in response to user input indicating that multi-SIM automatic synchronization should be activated, sending from the first apparatus to the second apparatus notification of acceptance of the request to activate multi-SIM automatic synchronization on the first apparatus and activating multi-SIM automatic synchronization on the first apparatus;
receiving, at the first apparatus from the second apparatus, information about an answered incoming call; and
in response to receiving the information about the answered incoming call from the second apparatus, updating one or more logs on the first apparatus to show that the call was answered and removing one or more notifications that indicate that the call is a missed call.

6. The method of claim 5, wherein the one or more data types includes sent text messages and further comprising: receiving at the first apparatus one or more copies of a sent text message from the second apparatus.

7. The method of claim 6, further comprising: storing the one or more copies of the sent text message received by the first apparatus in one or more sent messages folders.

8. The method of claim 5, wherein the request to activate multi-SIM automatic synchronization is wirelessly received from the second apparatus, and the notification of acceptance of the request to activate multi-SIM automatic synchronization is wirelessly sent to the second apparatus.

9. An apparatus comprising a processor and a memory containing executable instructions that, when executed by the processor, cause the apparatus to at least:
display a query for user input regarding activation of multiple-subscriber-identity-module ("multi-SIM") automatic synchronization;
in response to user input indicating that multi-SIM automatic synchronization should be activated, display a query for user input regarding one or more data types for which multi-SIM automatic synchronization should be performed, the one or more data types including incoming calls;
send to at least one additional apparatus a request to activate multi-SIM automatic synchronization on the at least one additional apparatus for the one or more data types for which multi-SIM automatic synchronization should be performed;
upon receiving notification of acceptance of the request to activate multi-SIM automatic synchronization on the at least one additional apparatus, activate multi-SIM automatic synchronization; and
in response to the activating, send information about an answered incoming call to the at least one additional apparatus instructing the at least one additional apparatus to update one or more logs to indicate that the call was answered and to remove one or more notifications that indicate that the call is a missed call.

10. The apparatus of claim 9, wherein the one or more data types includes sent text messages and containing further executable instructions that, when executed by the processor, cause the apparatus to send to the at least one additional apparatus a copy of a sent text message.

11. The apparatus of claim 10, containing further executable instructions that, when executed by the processor, cause the apparatus to at least: delete the copy of the sent text message.

12. The apparatus of claim 9, wherein the apparatus wirelessly sends the request to activate multi-SIM automatic synchronization to the at least one additional apparatus and wirelessly receives the notification of acceptance of the request to activate multi-SIM automatic synchronization directly from the at least one additional apparatus.

13. An apparatus comprising a processor and a memory containing executable instructions that, when executed by the processor, cause the apparatus to at least:
receive a request from a second apparatus to activate multiple-subscriber-identity-module ("multi-SIM") automatic synchronization on the apparatus for one or more data types for which multi-SIM automatic synchronization should be performed, the one or more data types including incoming calls;
display a query for user input regarding activation of multi-SIM automatic synchronization;
in response to user input indicating that multi-SIM automatic synchronization should be activated, send from the apparatus to the second apparatus notification of acceptance of the request to activate multi-SIM automatic synchronization on the apparatus and activate multi-SIM automatic synchronization on the apparatus;
receive, at the apparatus from the second apparatus, information about an answered incoming call; and
in response to receiving the information about the answered incoming call from the second apparatus, update one or more logs on the apparatus to show that the call was answered and remove one or more notifications that indicate that the call is a missed call.

14. The apparatus of claim 13, wherein the one or more data types includes sent text messages and containing further executable instructions that, when executed by the processor, cause the apparatus to receive one or more copies of a sent text message from the second apparatus.

15. The apparatus of claim 14, containing further executable instructions that, when executed by the processor, cause the apparatus to perform store the one or more copies of the sent text message in one or more sent messages folders.

16. The apparatus of claim 13, wherein the request to activate multi-SIM automatic synchronization is wirelessly received from the second apparatus, and the notification of acceptance of the request to activate multi-SIM automatic synchronization is wirelessly sent to the second apparatus.

17. A non-transitory computer-readable medium having recorded thereon computer-executable instructions, that, when executed, cause an apparatus to at least:
display a query for user input regarding activation of multiple-subscriber-identity-module ("multi-SIM") automatic synchronization;
in response to user input indicating that multi-SIM automatic synchronization should be activated, display a query for user input regarding one or more data types for which multi-SIM automatic synchronization should be performed, the one or more data types including incoming calls;
send to at least one additional apparatus a request to activate multi-SIM automatic synchronization on the at least one additional apparatus for the one or more data types for which multi-SIM automatic synchronization should be performed;

upon receiving notification of acceptance of the request to activate multi-SIM automatic synchronization on the at least one additional apparatus, activate multi-SIM automatic synchronization on the apparatus; and in response to the activating, send information about an answered incoming call to the at least one additional apparatus instructing the at least one additional apparatus to update one or more logs to indicate that the call was answered and to remove one or more notifications that indicate that the call is a missed call.

18. The computer-readable medium of claim 17, wherein the one or more data types includes sent text messages and the computer-readable medium has recorded thereon further executable instructions that, when executed by the processor, cause the apparatus to send to the at least one additional apparatus a copy of a sent text message; and delete the copy of the sent text message.

19. The computer-readable medium of claim 17, wherein the apparatus wirelessly sends the request to activate multi-SIM automatic synchronization to the at least one additional apparatus and wirelessly receives the notification of acceptance of the request to activate multi-SIM automatic synchronization from the at least one additional apparatus.

20. Apparatus comprising:
   means for displaying a query for user input regarding activation of multiple-subscriber-identity-module ("multi-SIM") automatic synchronization;
   means for displaying a query for user input regarding one or more data types for which multi-SIM automatic synchronization should be performed in response to user input indicating that multi-SIM automatic synchronization should be activated, the one or more data types including incoming calls;
   means for sending from the apparatus to at least one additional apparatus a request to activate multi-SIM automatic synchronization on the at least one additional apparatus for the one or more data types for which multi-SIM automatic synchronization should be performed; and
   means for activating multi-SIM automatic synchronization on the apparatus upon receiving notification of acceptance of the request to activate multi-SIM automatic synchronization on the at least one additional apparatus; and
   means for, in response to the activating, sending information about an answered incoming call to the at least one additional apparatus instructing the at least one additional apparatus to update one or more logs to indicate that the call was answered and to remove one or more notifications that indicate that the call is a missed call.

21. A non-transitory computer-readable medium having recorded thereon computer-executable instructions, that, when executed, cause an apparatus to at least:
   receive a request from a second apparatus to activate multiple-subscriber-identity-module ("multi-SIM") automatic synchronization on the apparatus for one or more data types for which multi-SIM automatic synchronization should be performed, the one or more data types including incoming calls;
   display a query for user input regarding activation of multi-SIM automatic synchronization;
   in response to user input indicating that multi-SIM automatic synchronization should be activated, send from the apparatus to the second apparatus notification of acceptance of the request to activate multi-SIM automatic synchronization on the apparatus and activate multi-SIM automatic synchronization on the apparatus;
   receive, at the apparatus from the second apparatus, information about an answered incoming call; and
   in response to receiving the information about the answered incoming call from the second apparatus, update one or more logs on the apparatus to show that the call was answered and remove one or more notifications that indicate that the call is a missed call.

22. The computer-readable medium of claim 21, wherein the one or more data types includes sent text messages and wherein the instructions, when executed, cause the apparatus to receive one or more copies of a text message sent by the second apparatus.

23. The computer-readable medium of claim 22, wherein the instructions, when executed, cause the apparatus to store the one or more copies of the sent text message in one or more sent messages folders.

24. The computer-readable medium of claim 21, wherein the request to activate multi-SIM automatic synchronization is wirelessly received from the second apparatus, and the notification of acceptance of the request to activate multi-SIM automatic synchronization is wirelessly sent to the second apparatus.

* * * * *

UNITED STATES PATENT AND TRADEMARK OFFICE
CERTIFICATE OF CORRECTION

| | |
|---|---|
| PATENT NO. | : 8,010,158 B2 |
| APPLICATION NO. | : 11/963169 |
| DATED | : August 30, 2011 |
| INVENTOR(S) | : Jukka Antero Parkkinen et al. |

It is certified that error appears in the above-identified patent and that said Letters Patent is hereby corrected as shown below:

Column 10, Claim 15, Line 44:
   Please delete "perform"

Signed and Sealed this
Eighth Day of May, 2012

David J. Kappos
*Director of the United States Patent and Trademark Office*